(12) United States Patent
Zhan et al.

(10) Patent No.: US 11,382,282 B2
(45) Date of Patent: Jul. 12, 2022

(54) MULTIFUNCTIONAL SEEDLING CULTURING APPARATUS

(71) Applicant: FUJIAN SANAN SINO-SCIENCE PHOTOBIOTECH CO., LTD., Quanzhou (CN)

(72) Inventors: Zhuo Zhan, Quanzhou (CN); Zhiyin Li, Quanzhou (CN); Yayuan Wang, Quanzhou (CN); Ying Chen, Quanzhou (CN)

(73) Assignee: FUJIAN SANAN SINO-SCIENCE PHOTOBIOTECH CO., LTD., Quanzhou (CN)

( * ) Notice: Subject to any disclaimer, the term of this patent is extended or adjusted under 35 U.S.C. 154(b) by 0 days.

(21) Appl. No.: 16/966,457

(22) PCT Filed: Aug. 16, 2019

(86) PCT No.: PCT/CN2019/100932
§ 371 (c)(1),
(2) Date: Jul. 30, 2020

(87) PCT Pub. No.: WO2020/140437
PCT Pub. Date: Jul. 9, 2020

(65) Prior Publication Data
US 2021/0029894 A1 Feb. 4, 2021

(30) Foreign Application Priority Data
Jan. 4, 2019 (CN) .......................... 201910007972.6

(51) Int. Cl.
*A01G 9/24* (2006.01)
*A01G 9/029* (2018.01)

(52) U.S. Cl.
CPC ............. *A01G 9/0299* (2018.02); *A01G 9/24* (2013.01)

(58) Field of Classification Search
CPC .......... A01G 9/0299; A01G 9/24; A01G 9/02
See application file for complete search history.

(56) References Cited

U.S. PATENT DOCUMENTS

| 3,039,621 A | * | 6/1962 | Pilcher ................. A47B 57/485 |
| | | | 108/107 |
| 10,244,595 B2 | | 3/2019 | Grajcar |
| 2018/0255712 A1 | * | 9/2018 | Smal ..................... A01G 9/0295 |

FOREIGN PATENT DOCUMENTS

| CN | 204616544 U | | 9/2015 | |
| CN | 204616544 U | * | 9/2015 | ............. A01G 31/06 |
| CN | 105724038 A | * | 7/2016 | ............... A01G 9/00 |
| CN | 106184467 A | * | 12/2016 | ........... A01G 9/0299 |

(Continued)

*Primary Examiner* — Peter M Poon
*Assistant Examiner* — Carly W. Lynch
(74) *Attorney, Agent, or Firm* — Dragon Sun Law Firm, P.C; Jinggao Li, Esq.; Nathaniel Perkins

(57) ABSTRACT

A multifunctional seedling culturing apparatus includes a fixed seedling culturing pedestal and a movable seedling culturing shelf cart, where the fixed seedling culturing pedestal includes a frame, and light sources are disposed on the frame; the movable seedling culturing shelf cart includes a board shelf, at least two boards are disposed on the board shelf, planting plates are disposed on the at least two boards, a movable apparatus is disposed on a bottom of the board shelf, and the at least two boards on the board shelf match light source positions on the fixed seedling culturing pedestal.

3 Claims, 4 Drawing Sheets

(56) References Cited

FOREIGN PATENT DOCUMENTS

| | | | | |
|---|---|---|---|---|
| CN | 107223480 A | * | 10/2017 | ............. A01G 31/06 |
| CN | 107223480 A | | 10/2017 | |
| CN | 107241949 A | * | 10/2017 | ........... A01C 11/025 |
| CN | 109699341 A | | 5/2019 | |
| CN | 209732106 U | | 12/2019 | |
| EP | 3292750 A1 | | 3/2018 | |
| JP | H09131138 A | * | 5/1997 | ........... A01G 9/0299 |
| KR | 200150249 Y1 | | 7/1999 | |
| KR | 100918155 B1 | * | 9/2009 | ............. A01G 9/249 |
| SE | 429811 B | | 10/1983 | |
| TW | M329332 U | | 4/2008 | |
| TW | M449451 U1 | | 4/2013 | |
| WO | 2013165248 A1 | | 11/2013 | |
| WO | WO-2017191819 A1 | * | 11/2017 | ........... A01G 9/0299 |

* cited by examiner

MULTIFUNCTIONAL SEEDLING CULTURING APPARATUS

CROSS-REFERENCE TO THE RELATED APPLICATIONS

This application is the national stage entry of International Application No. PCT/CN2019/100932, filed on Aug. 16, 2019, which is based upon and claims priority to Chinese Patent Application No. 201910007972.6, filed on Jan. 4, 2018, the entire contents of which are incorporated herein by reference.

TECHNICAL FIELD

The present invention relates to the field of plant growing and culturing device technologies, and specifically, to an LED multilayer plant seedling culturing apparatus, which can be suitable for seedlings culturing of a plurality of species of plants and is a seedling culturing apparatus that meets the requirements of culturing manners, such as water culturing, soil culturing and substrate culturing.

BACKGROUND

In methods for seedling culturing, a very common one is to perform seedling culturing by outdoor soil culturing. Conventional seedling culturing manners are affected by a plurality of factors, such as the geographical environment, the climate, and the temperature difference. Seedling culturing is performed on cultured seedlings by manual irrigation and PE film heat and moisture preservation technologies. The germination rates and seedling culturing conditions of the seedlings are uneven. The seedlings have delayed germination due to some factors, or even have no germination.

Existing seedling culturing technologies are mainly embodied in seedling culturing apparatuses. An LED artificial light source is mainly used for indoor culturing. There are two common types of structures of the seedling culturing apparatuses: a shelf-form multilayer structure and an independent seedling culturing box structure.

In shelf-type seedling culturing, when soil culturing is used, manual irrigation is uneven and environmental pollution is likely to be caused. When water culturing is used, manual carriage is required. Liquid is likely to be spilled out during carriage. The speed is slow, and it is difficult to implement large scale transportation. Box-type seedling culturing is performed by using a technology of apparatus integration. The use manner of box-type seedling culturing is usually same as that of the shelf-type seedling culturing. During soil culturing, manual irrigation is uneven, and during water culturing, the liquid is spilled out due to an uneven horizontal plane when lifted during transportation. In addition, the transportation is inconvenient and additional devices need to be added for transportation. The box-type device is not suitable for use of genes of large scale seedling culturing. Because manual carriage for a plurality of times is required in operation, the cost is excessively high.

The shelf-type seedling culturing device in the prior art is usually mounted and spliced by shelves, and a fixed multilayer structure needs to be built by screws and fixed LED light sources. When the layer height needs to be changed, eighty percent of the shelves needs to be removed, and this is time-consuming and labor-consuming. The removal and mounting cannot be finished by a person alone, and tools further need to be used. The independent seedling culturing box usually uses a seedling culturing mode of LED luminescence on two sides. At the light supplementing requirement, excessively dense layer heights cannot be implemented, and excessively dense layer heights make light uneven. In addition, the seedling culturing can only be implemented in a small area. The cost of the device is relatively high, and the device needs to be maintained by professionals once broken, and is not suitable for culturing in a large area.

In the device embodied in the foregoing field of the conventional seedling culturing and existing seedling culturing technologies, the arising problems limit versatility and efficiency of use. In the field of seedlings culturing, there are mainly three manners at present. The first manner is greenhouse seedling culturing, by which the seedling plants grow variously, cover a large area, and require more manual maintenance. The second manner is LED shelf-type three-dimensional seedling culturing, in which the seedling plates need to be carried onto the shelves one by one after seeding and be taken down from the shelves one by one after culturing, and most of seedlings require manual watering irrigation, the operation is complex and the second manner is not beneficial to large scale culturing of seedlings. The third manner is an independent seedling culturing box. In this culturing manner, the cost of the device is high, and the third manner is not suitable for large scale seedling culturing.

SUMMARY

Therefore, a movable three-dimensional multifunctional intelligent seedling culturing apparatus needs to be provided, to implement modularized, intelligentized, efficient and productive seedling culturing.

In order to achieve the foregoing objective, the present invention provides a multifunctional seedling culturing apparatus, which includes a fixed seedling culturing pedestal and a movable seedling culturing shelf cart, where the seedling culturing pedestal includes a frame, and light sources are disposed on the frame.

The movable seedling culturing shelf cart includes a board shelf, at least two boards are disposed on the board shelf, planting plates are disposed on the boards, a movable apparatus is disposed on the bottom of the board shelf, and the boards on the board shelf match the light source positions on the seedling culturing pedestal.

Further, the frame includes a vertical support and a top support, a ventilating board and a ventilating device are disposed on the vertical support and/or the top support, and the plurality of lamp panels is disposed on the ventilating board of the vertical support in a lateral outward-extending manner.

Further, a plurality of air holes is disposed on the ventilating board, and the ventilating device extracts external air and exhausts air flows from the air holes on the ventilating board to form a ventilating and exhaust system.

Further, a gear-toggling adjustment support is fixed on the ventilating board, and the lamp panels are connected to the gear-toggling adjustment support by corbel supports. The gear-toggling adjustment support is the fixed adjustment holes evenly disposed on the ventilating board, and the heights of the lamp panels are adjusted through the fixed adjustment holes fixed by the corbel supports at different heights.

Further, a black-out cloth is disposed on the frame, a support leg is disposed on the bottom of the frame, and the support leg is configured to limit and fix the movable seedling culturing shelf cart.

Further, an environment control module is disposed on the vertical support.

Further, guide rails are disposed on the bottom of the frame, and the width of the guide rails matches the relative distance of casters with breaks at the bottom of the board shelf.

Further, fixing grooves are disposed on the guide rails, and snap-in portions matching the fixing grooves are disposed on the movable seedling culturing shelf cart.

Further, a water and electricity pipeline is mounted in the top support and/or the vertical support, and the water and electricity pipeline is mounted in a hidden manner.

Further, gear adjustment holes are disposed on the board shelf, and the mounting height of the board on the board shelf is adjusted through the height adjustment holes.

Further, funnels and/or water pipes are disposed on the movable seedling culturing shelf cart.

Different from the prior art, the foregoing technical solutions have the following technical effects:

1. In the present invention, a multifunctional seedling culturing apparatus composed of a mobile module and a fixed module is designed. The fixed module is the seedling culturing pedestal, and the seedling culturing pedestal is composed of a light source module, an irrigation module and an environment control module. The light source module is composed of the lamp panels and support arms, and the different heights are fixed by the evenly distributed fixed adjustment holes on the ventilating board; a main pipe line of the irrigation module is hidden in the fixed module, and can implement technologies such as tidal irrigation, drip irrigation and spraying; the environment control module has an upper exhaust outlet and an inside ventilating board to control the balance of a seedling culturing environment and ensure the seedlings to grow consistently. The mobile module is the seedling culturing shelf cart, and the guide rails are disposed on the seedling culturing shelf cart, and seedling culturing trays may be put on the guide rails. A mechanism that can adjust the shelf heights is designed on the shelf, so that the shelf heights may be quickly adjusted according to the growing heights of different plants, to facilitate carriage and implementing automated transportation. The multifunctional seedling culturing apparatus implements modularization. One and more rows can be assembled and spliced to form a set by a plurality of modules (multifunctional seedling culturing apparatus), the modules can be dissembled and assembled, to quickly build small-sized, medium-sized, and large-sized seedling culturing factories.

2. In the present invention, a plurality of groups of splicing can be combined, to save space. The flexibility is high. The seedling culturing shelf cart is movable, and the heights of layers can be changed. The problems of a low utility rate of space and unicity of cultured seedlings are resolved. To a large extent, the human labor cost problem is resolved, and working time efficiency is increased.

3. In the present invention, ventilation and heat dissipation of a set of system are performed through cooling by a simple individual module environment control system, and integrated heat dissipation, air exhaustion and cooling may be implemented through series connection. Therefore, in the cooling system, the cost of device development can be reduced, and in addition, the heat dissipation of seedlings is improved, and the heat dissipation and ventilation area is increased.

4. In the present invention, a carrier of the seedling culturing apparatus is in a three-dimensional hollow structure. In an LED lamp source module, different layer heights are quickly changed by the fixed adjustment holes on an apparatus board, and the tightness only needs to be adjusted by hands, and tools do not need to be used. The seedling culturing shelf cart in the seedling culturing apparatus is also adjustable, and different layer heights are also quickly adjusted through the fixed adjustment holes.

Figure 1:
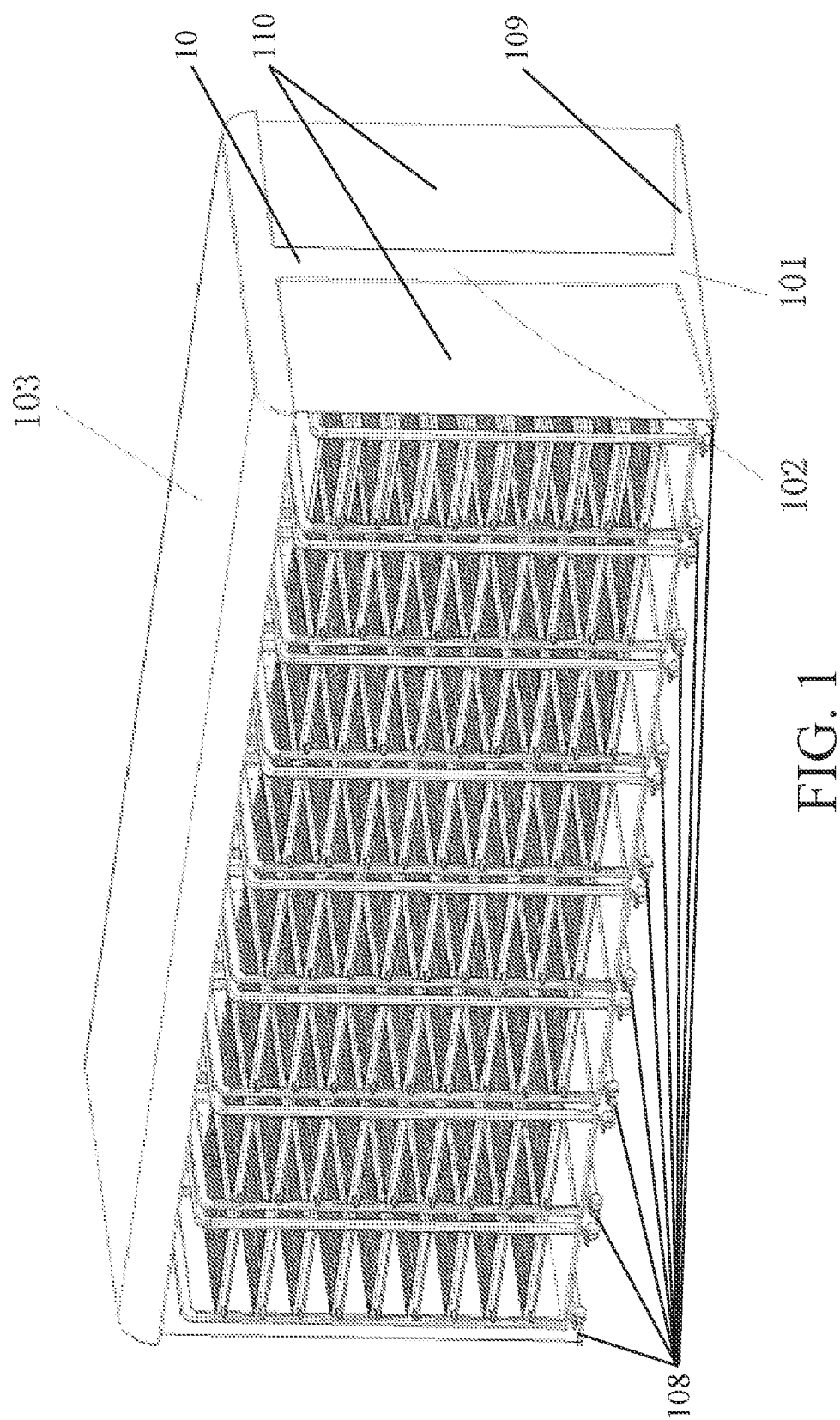
FIG. 1 is a three-dimensional schematic diagram of an overall structure according to embodiments of the present invention.
Figure 2:
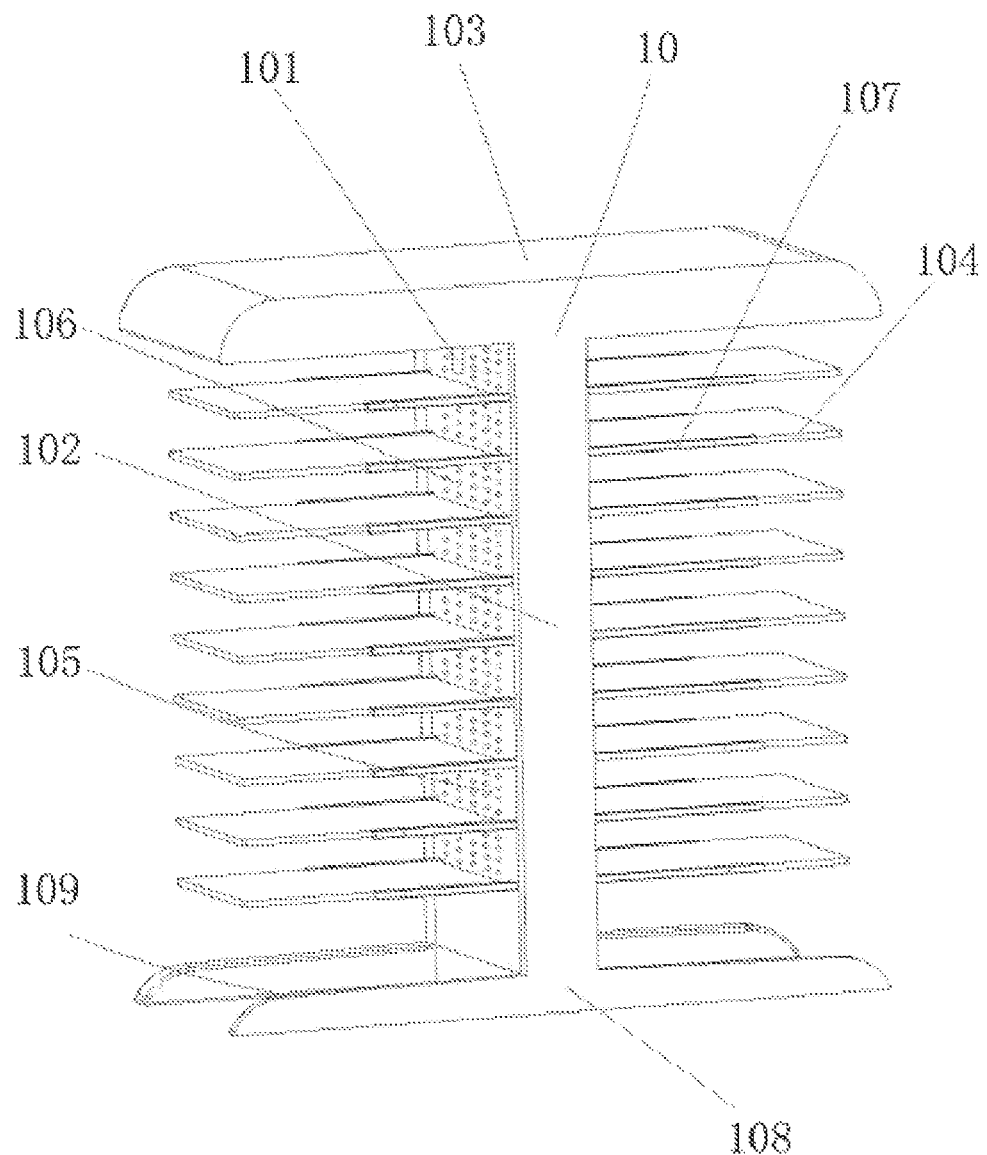
FIG. 2 is a three-dimensional schematic diagram of a seedling culturing pedestal according to the embodiments of the present invention.
Figure 3:
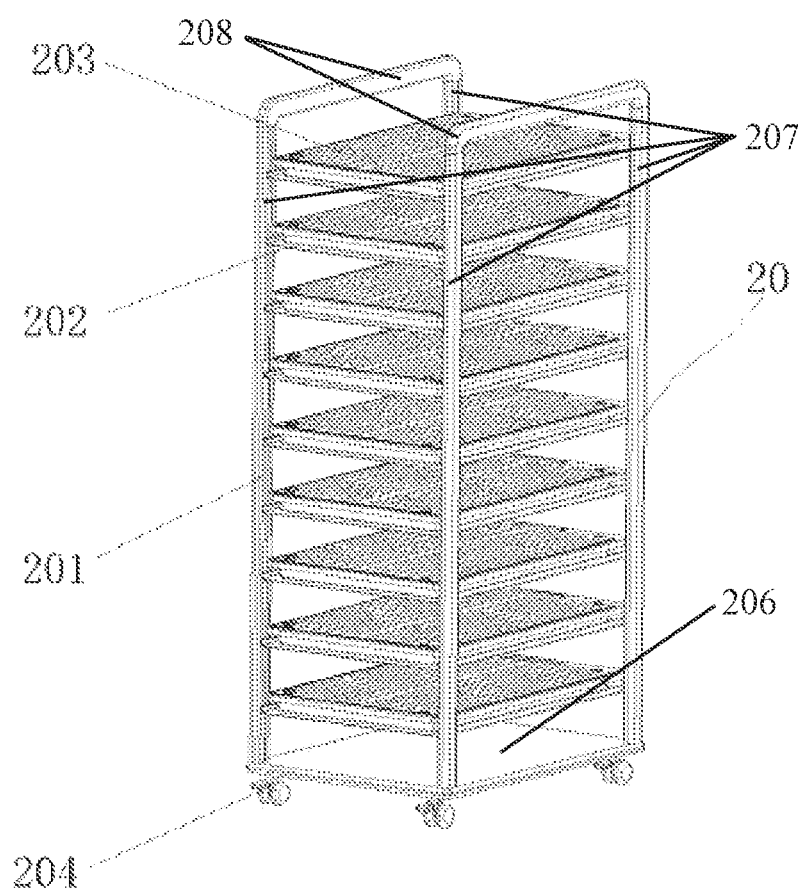
FIG. 3 is a three-dimensional schematic diagram of a seedling culturing shelf cart according to the embodiments of the present invention.
Figure 4:
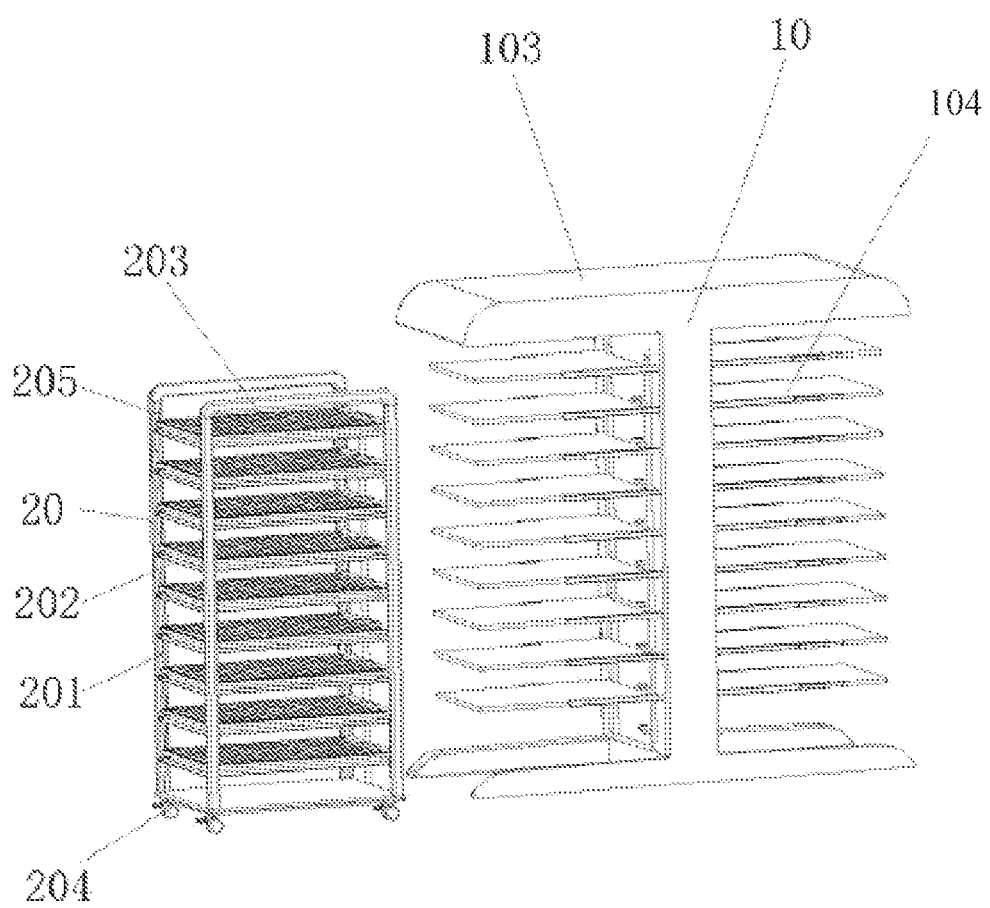
FIG. 4 is a three-dimensional schematic diagram of a seedling culturing pedestal matching a seedling culturing shelf cart according to the embodiments of the present invention.

Description of reference numerals: 10. Seedling culturing pedestal; 20. Seedling culturing shelf cart; 101. Frame; 102. Vertical support; 103. Top support; 104. Lamp panel; 105. Ventilating board; 106. Air hole; 107. Corbel support; 108. Support leg; 109. Guide rail; 201. Board shelf; 202. Board; 203. Planting plate; 204. Movable apparatus; 205. Gear adjustment hole.

DETAILED DESCRIPTION OF THE EMBODIMENTS

In order to illustrate in detail technical contents, structural features, achieved objectives and effects of the technical solutions, the following detailed description is provided with reference to specific embodiments and the drawings.

As shown in FIG. 1 to FIG. 4, an embodiment of the present invention provides a multifunctional seedling culturing apparatus, which includes a fixed seedling culturing pedestal 10 and a movable seedling culturing shelf cart 20, where the seedling culturing pedestal 10 includes a frame 101, the frame 101 includes a vertical support 102 and a top support 103, a ventilating board 105 and a ventilating device are disposed on the vertical support 102 and the top support 103, and a plurality of lamp panels 104 is disposed on the ventilating board 105 of the vertical support in a lateral outward-extending manner. In this embodiment, an environment control module is disposed on the vertical support 102. In this embodiment, a plurality of air holes 106 is disposed on the ventilating board 105, and the ventilating device extracts external air and exhausts air flows from the air holes 106 on the ventilating board to form a ventilating and exhaust system. The plurality of air holes 106 may be further defined as fixed adjustment holes 106 configured to adjust the heights of the lamp panels, and also defined as a gear-toggling adjustment support in this embodiment. The gear-toggling adjustment support is the fixed adjustment holes 106 evenly disposed on the ventilating board. Therefore, the gear-toggling adjustment support is fixed on the ventilating board, and the lamp panels 104 are connected to the gear-toggling adjustment support by the corbel supports 107. The gear-toggling adjustment support is the fixed adjustment holes 106 evenly disposed on the ventilating board 105, and the heights of the lamp panels 104 are adjusted through the fixed adjustment holes 106 fixed by the corbel supports 107 at different heights. Light sources are disposed on the lamp panels 104, and an irrigation apparatus is disposed on the frame. Two plates 110 are each disposed under the top support 103 and above the two guide rails 109 and disposed on each side of the fixed seedling culturing pedestal 10, wherein the top support 103 extends along the two plates 110.

The movable seedling culturing shelf cart 20 includes a board shelf 201, a plurality of boards 202 is disposed on the board shelf 201, planting plates 203 are removably connected to the boards 202, and in other embodiments, the planting plates may alternatively be planting grooves formed on the boards. The board plate 205 includes bottom plate 206, four vertical rods 207 and two horizontal rods 208 on top connected to the four vertical rods 207. The plurality of boards are perpendicular or substantially perpendicular to the four vertical rods 207 and each of the plurality of boards 202 are parallel or substantially parallel to each other. A movable apparatus 204 is disposed on the bottom of the board shelf 201, and the movable apparatus 204 is casters 204 with breaks. The boards 202 on the board shelf 201 match the positions of the lamp panels 104 on the seedling culturing pedestal, and the lamp panels 104 provide the light sources for the planting plates on the boards 202.

In this embodiment, a black-out cloth (not shown) is disposed on the frame 101, a support leg 108 is disposed on the bottom of the frame, and the support leg 108 is configured to limit and fix the movable seedling culturing shelf cart.

In this embodiment, guide rails 109 are disposed on the bottom of the frame, and the width of the guide rails 109 matches the relative distance of the casters with breaks at the bottom of the board shelf. The support leg 108 and the guide rails 109 are integrally formed. Therefore, in this embodiment, the support leg 108 and the vertical support 102 are formed into a T-shaped structure, and the guide rails 109 are embedded in the oppositely disposed support leg 108.

In this embodiment, fixing grooves are disposed on the guide rails 109, and snap-in portions matching the fixing grooves are disposed on the movable seedling culturing shelf cart.

In this embodiment, a water and electricity pipeline is mounted in the top support 103 and/or the vertical support 102, and the water and electricity pipeline is mounted in a hidden manner.

In this embodiment, gear adjustment holes are disposed on the board shelf 201, and the mounting height of the board 202 on the board shelf is adjusted through the height adjustment holes. Specifically referring to FIG. 4, the shown gear adjustment holes 205 are disposed on two sides of the board shelf 201. The fixation between the boards 202 and the gear adjustment holes 205 at different heights is adjusted by manually adjusting the tightness of screws to further adjust the heights of the boards.

In this embodiment, funnels and/or water pipes are disposed on the movable seedling culturing shelf cart.

A working principle of this embodiment is as follows: the heights of the boards 202 are adjusted by adjusting gear adjustment grooves of the seedling culturing shelf cart 20, to make the heights of the boards 202 match the heights of seeds that need to be planted. Seedlings are planted in the planting plates 203, and then the planting plates 203 are put on the boards 202. Correspondingly, the gear-toggling adjustment support disposed on the ventilating board 105 of the seedling culturing pedestal 10 is adjusted, and then the heights of the lamp panels 104 are adjusted through the fixed adjustment holes 106 fixed by the corbel supports 107 at different heights, to make the heights of the lamp panels 104 match the heights of the planting plates 203 on the boards 202 of the seedling culturing shelf cart 20. In this way, the light sources on the lamp panels 104 can provide the growing light sources for the plants of the whole planting plates 203. A whole fixed module is the seedling culturing pedestal, and the seedling culturing pedestal is composed of a light source module, an irrigation module and an environment control module. The light source module is composed of the lamp panels and support arms, and the different heights are fixed by the evenly distributed fixed adjustment holes on the ventilating board; a main pipe line of the irrigation module is hidden in the fixed module, and can implement technologies such as tidal irrigation, drip irrigation and spraying; the environment control module has an upper exhaust outlet and an inside ventilating board to control the balance of a seedling culturing environment and ensure the seedlings to grow consistently. A mobile module is the seedling culturing shelf cart, and the guide rails are disposed on the seedling culturing shelf cart, and seedling culturing trays may be put on the guide rails. A mechanism that can adjust the shelf heights is designed on the shelf, so that the shelf heights may be quickly adjusted according to the growing heights of different plants, to facilitate carriage and implementing automated transportation. The multifunctional seedling culturing apparatus implements modularization. One and more rows can be assembled and spliced to form a set by a plurality of modules (multifunctional seedling culturing apparatus), the modules can be dissembled and assembled, to quickly build small-sized, medium-sized, and large-sized seedling culturing factories.

As shown in FIG. 1, the fixed seedling culturing pedestal matches the one or more movable seedling culturing shelf carts, and therefore, in this embodiment, a plurality of groups of splicing can be combined, to save space. The flexibility is high. The seedling culturing shelf cart is movable, and the heights of layers can be changed. The problems of a low utility rate of space and unicity of cultured seedlings are resolved. To a large extent, the human labor cost problem is resolved, and working time efficiency is increased.

In this embodiment, ventilation and heat dissipation of a set of system are performed through cooling by a simple individual module environment control system, and integrated heat dissipation, air exhaustion and cooling may be implemented through series connection. Therefore, in the cooling system, the cost of device development can be reduced, and in addition, the heat dissipation of seedlings is improved, and the heat dissipation and ventilation area is increased.

In this embodiment, a carrier of the seedling culturing apparatus is in a three-dimensional hollow structure. In an LED lamp source module, different layer heights are quickly changed by the fixed adjustment holes on an apparatus board, and the tightness only needs to be adjusted by hands, and tools do not need to be used. The seedling culturing shelf cart in the seedling culturing apparatus is also adjustable, and different layer heights are also quickly adjusted through the fixed adjustment holes.

In this specification, relational terms such as first and second are only used to distinguish one entity or operation from another, and do not necessarily require or imply that any actual relationship or sequence exists between the entities or operations. Moreover, the terms "comprise", "include", or their any other variant are intended to cover a non-exclusive inclusion, so that a process, a method, an article, or terminal device that includes a list of elements not only includes those elements but also includes other elements that are not expressly listed, or further includes elements inherent to such a process, method, article, or terminal device. Without further limitation, the element defined by a phrase "comprise . . . " or "include . . . " does not exclude other elements in the process, method, article or terminal device that include the element. In addition, in this specification, "larger than", "less than", and "exceed" are interpreted as not including the numeric, and "above", "below", and "within" are interpreted as including the numeric.

Although the foregoing embodiments are described, persons skilled in the art can make additional changes and modifications to the embodiments once basic creative concepts are learned. Therefore, the foregoing is only embodiments of the present invention, and are not intended to limit the patent protection scope of the present invention. Any equivalent structure or equivalent process transformation used by the description and drawings of the present invention, or directly or indirectly used in other related technical fields, are also included in the patent protection scope of the present invention.

What is claimed is:

1. A multifunctional seedling culturing apparatus, comprising a fixed seedling culturing pedestal (10) and a plurality of movable seedling culturing shelf carts (20), wherein the fixed seedling culturing pedestal (10) comprises:
    a frame (101), wherein the frame (101) comprises a vertical support (102) and a top support (103) being perpendicular or substantially perpendicular to the vertical support (102); and the vertical support (102) and the top support (103) form an upper T-shaped structure;
    a ventilating board (105) disposed on the vertical support (102) and configured to implement heat dissipation, air exhaustion and cooling through a series connection; and
    a plurality of lamp panels (104) disposed on the frame (101), wherein each of the plurality of lamp panels (104) is parallel or substantially parallel to each other; is further parallel or substantially parallel to the top support (103); and is perpendicular or substantially perpendicular to the ventilating board (105); and the plurality of lamp panels (104) with light sources is disposed on the ventilating board (105) of the vertical support (102) in a lateral outward-extending manner;
    a plurality of air holes (106) evenly disposed on the ventilating board (105), wherein the plurality of air holes (106) are configured to adjust heights of the lamp panels (104);
    corbel supports (107) orientated along the lateral outward-extending manner, wherein two of the corbel supports (107) are disposed on two sides of each of the plurality of lamp panels (104); the plurality of the lamp panels (104) is connected to the plurality of air holes (106) by the corbel supports (107); and heights of the each of the lamp panels (104) are adjusted through the plurality of holes (106) by the corbel supports (107) at different heights;
    a plurality of support legs (108) disposed on a bottom of the frame (101), wherein the plurality of support legs (108) are configured to limit and fix the plurality of movable seedling culturing shelf carts (20);
    a plurality of guide rails (109) disposed on the bottom of the frame (101), the plurality of support legs (108) and the plurality of guide rails (109) are integrally formed and are formed into a lower upside-down T-shaped structure, and each guide rail of the plurality of guide rails (109) are embedded in each support leg of the plurality of support legs (108); and
    two plates (110) each disposed under the top support (103) and above outer guide rails of the plurality of guide rails (109) and disposed on each side of the fixed seedling culturing pedestal (10), wherein the top support (103) extends along the two plates (110);
    wherein the plurality of support legs (108) are evenly spaced according to a width of the plurality of movable seedling culturing shelf carts (20);
    each of the plurality of movable seedling culturing shelf carts (20) comprises:
    a board shelf (201) comprising a bottom plate 206, four vertical rods (207) and two horizontal rods (208) on top connected to the four vertical rods (207);
    a plurality of boards (202) disposed on the board shelf (201) and perpendicular or substantially perpendicular to the four vertical rods (207) and each of the plurality of boards (202) are parallel or substantially parallel to each other;
    a plurality of planting plates (203) removably connected to the boards (202) and disposed on the plurality of boards (202) and perpendicular or substantially perpendicular to the four vertical rods (207) and each of the plurality of boards (202) are parallel or substantially parallel to each other, and is further parallel or substantially parallel to the plurality of boards (202);
    a movable apparatus (204) disposed on a bottom of the board shelf (201), and the plurality of boards on the board shelf (201) match a plurality of lamp panel positions on the fixed seedling culturing pedestal (10); wherein the movable apparatus (204) comprises casters 204 with breaks;
    adjustment holes (205) disposed on both sides of the board shelf (201), wherein mounting height of the boards (202) on the board shelf is adjusted through the adjustment holes (205); fixation between the boards (202) and the adjustment holes (205) at different heights is adjusted by manually adjusting tightness of screws to further adjust the mounting heights of the boards (202), wherein,
    the plurality of the movable seedling culturing shelf carts (20) is configured to move into the fixed seedling culturing pedestal (10) in the lateral outward-extending manner and locked with the fixed seedling culturing pedestal (10); a width between the two guide rails (109) matches relative distances of the casters (204) with breaks of the plurality of movable seedling culturing shelf carts (20) at a bottom of the movable seedling culturing shelf (20); heights of the lamp panels (104) match the heights of the planting plates (203) on the boards (202) of the seedling culturing shelf carts (20); each of the lamp panels (104) is disposed above each of the planting plates on the boards (202) and provides one of the light sources for the each of the planting plates on the boards (202) directly.

2. The multifunctional seedling culturing apparatus according to claim 1, wherein a water and electricity pipeline is mounted in the top support (102) and/or the vertical support (103), and the water and electricity pipeline is mounted in a hidden manner.

3. The multifunctional seedling culturing apparatus according to claim 2, wherein the water and electricity pipeline is configured for one or more of tidal irrigation, drip irrigation, and spraying.

* * * * *